United States Patent [19]

Marcus et al.

[11] 4,172,661
[45] Oct. 30, 1979

[54] OPTICAL MEASURING METHOD

[75] Inventors: Holger Marcus; Lennart Nordström, both of Lidingö, Sweden

[73] Assignee: AGA Aktiebolag, Lidingo, Sweden

[21] Appl. No.: 908,689

[22] Filed: May 23, 1978

[51] Int. Cl.² ............................................. G01B 11/26
[52] U.S. Cl. ........................................ 356/152; 356/5; 356/141; 364/460
[58] Field of Search ........................... 356/141, 152, 5; 364/460

[56] References Cited

U.S. PATENT DOCUMENTS

| | | | |
|---|---|---|---|
| 3,866,229 | 2/1975 | Hammack | 364/460 |
| 3,897,151 | 7/1975 | Lecroy | 356/141 |
| 4,025,192 | 5/1977 | Scholdstrom et al. | 356/152 |

*Primary Examiner*—S. C. Buczinski
*Attorney, Agent, or Firm*—Larson, Taylor and Hinds

[57] ABSTRACT

A method of making a series of measurements of the relative position of a point on the surface of an object in an object related coordinate system is disclosed. The object is turnable around an axle. The point, which moves between each measurement, is measured by an optical distance and angle measuring device which is placed each time in an arbitrary position in an earth-related coordinate system. The measurements of the position of said point are transformed from an earth related coordinate system to the object related coordinate system. By comparing the current measurement of the point with past measurements of the point, the wear on the surface of the object can be determined.

11 Claims, 3 Drawing Figures

OPTICAL MEASURING METHOD

FIELD OF INVENTION

This invention relates to distance measuring methods and particularly to distance measuring methods employing electro-optical equipment.

BACKGROUND OF THE INVENTION

In the manufacture of steel, furnaces are often lined with refractory material. This refractory material wears as a result of the process. After the refractory material has worn down to predetermined levels it must be replaced, otherwise a dangerous situation may arise wherein the molten steel will leak from the furnace. Steel making equipment is quite expensive and the economic efficiency of such equipment is dependent upon the length of time a furnace can be employed without having to be shut down for the providing of a new refractory lining. Therefore, it is of substantial economic significance to employ a refractory lining as long as possible, yet it is also important not to allow the lining to be used when it has worn below a safe minimum thickness.

Presently, several methods have been employed for monitoring the thickness of refractory linings in steel making equipment. One of the best is described in U.S. Pat. No. 4,025,192 by the same applicant and invented by Ragnar Schöldström et al. In accordance with that method measuring is made to three non-collinear reference points on the object from a distance measuring instrument placed in an arbitrary position in front of a furnace. This measuring is made with the furnace already in a measuring position with its front surface turned to the distance measuring device. In order to make sure that the reference points can be seen from the distance measuring device these points most often have to be placed on the front side of the furnace surrounding the opening to the inside of the furnace. There is a tendency for a deposit of slag to form on the front side of the furnace during the oxygen blowing process, when the molten steel is poured out from the furnace through said opening and also when, during the melting process, materials are transported through the opening. This deposit can often amount to a thickness of several decimeters. Therefore, in order to perform this known method the front side of the furnace must be cleaned now and then in order to uncover the marks on the reference points.

SUMMARY OF INVENTION

In order to overcome the problems of the prior art, the present invention provides a method of making a series of measurements from an arbitrary position in front of a furnace or objects of other types, such as mixers, moving around a tilting axle and whose lining is erroded.

The teachings in accordance with our invention are based upon the fact that the tilting axle is in a fixed relationship to an earth related as well as to an object related co-ordinate system. Therefore, after the distance measuring instrument has been set up in front of an object to be measured, the first thing is to find the position of the tilting axle in relation to the instrument. This could be done in at least two different ways. One of them is to make measurements to marks in the space with known relation to the tilting axle in the earth related co-ordinate system. Another is to make measurements to a point marked on the object when the object is in at least three different angular positions around the tilting axle. The tilting axle can then be calculated as being the normal to a surface through the measured locations for the point in question going through the center of a circle through the locations.

It is also necessary to indicate the position of the object around the tilting axle, and this is made either by having an angle measuring device placed on the tilting axle itself or by making measurement to a mark on the object with a known relation to the tilting axle.

Some times there is axial-play in the tilting bearings or small thermal or elastic deformations and if this is the case there is a certain risk that the measurement to the point with the unknown position in the furnace-related co-ordinate system can give a wrong result. Therefore, in accordance with another feature of the invention a measurement is also made to a test point on the furnace with known relation to the tilting axle before the measurement to the point of interest is made. The position of the test point in furnace-related co-ordinates is calculated by the calculator. If this calculated value differs from the known value the play in the bearings and the deformation due to gravity are indicated and a correction of the calculated position of the furnace in the earth-related co-ordinate system is made into better agreement with the true position or else the whole measuring procedure has to be started again from the beginning.

In accordance with a further aspect to the invention two earth related co-ordinate systems are used, the natural one based at the instrument and an aid system with the first of the axes along the tilting axle, a second axis perpendicular to the true vertical and the tilting axle and a third axis orthogonal to the other two.

The object related co-ordinate system is preferably designed to have one of its co-ordinate axes along the central line of the furnace and a second axis parallel to a line perpendicular both to the central axis and to the tilting axle intersecting both. The third co-ordinate axis is perpendicular to the other two and it is apparent that it is parallel to the tilting axle only if the tilting axle is perpendicular to the central axis. If the central axis and the tilting axle should be parallel or coincide the other two orthogonal axes of the object related co-ordinate system must be related to some characteristic points on the furnace.

Origin of the aid co-ordinate system is preferably chosen to be situated where the line, intersecting both the tilting axle and the central axis, intersects the tilting axle. Origin of the object related co-ordinate system is chosen to be situated on the central axis at a point from which, with regard to the design of the object, it is considered best to relate the axial position from the axis of a measured point of the object. This origin is best chosen by studying, in every separate case, the vessel drawing.

DETAILED DESCRIPTION OF THE INVENTION

Figure 1:
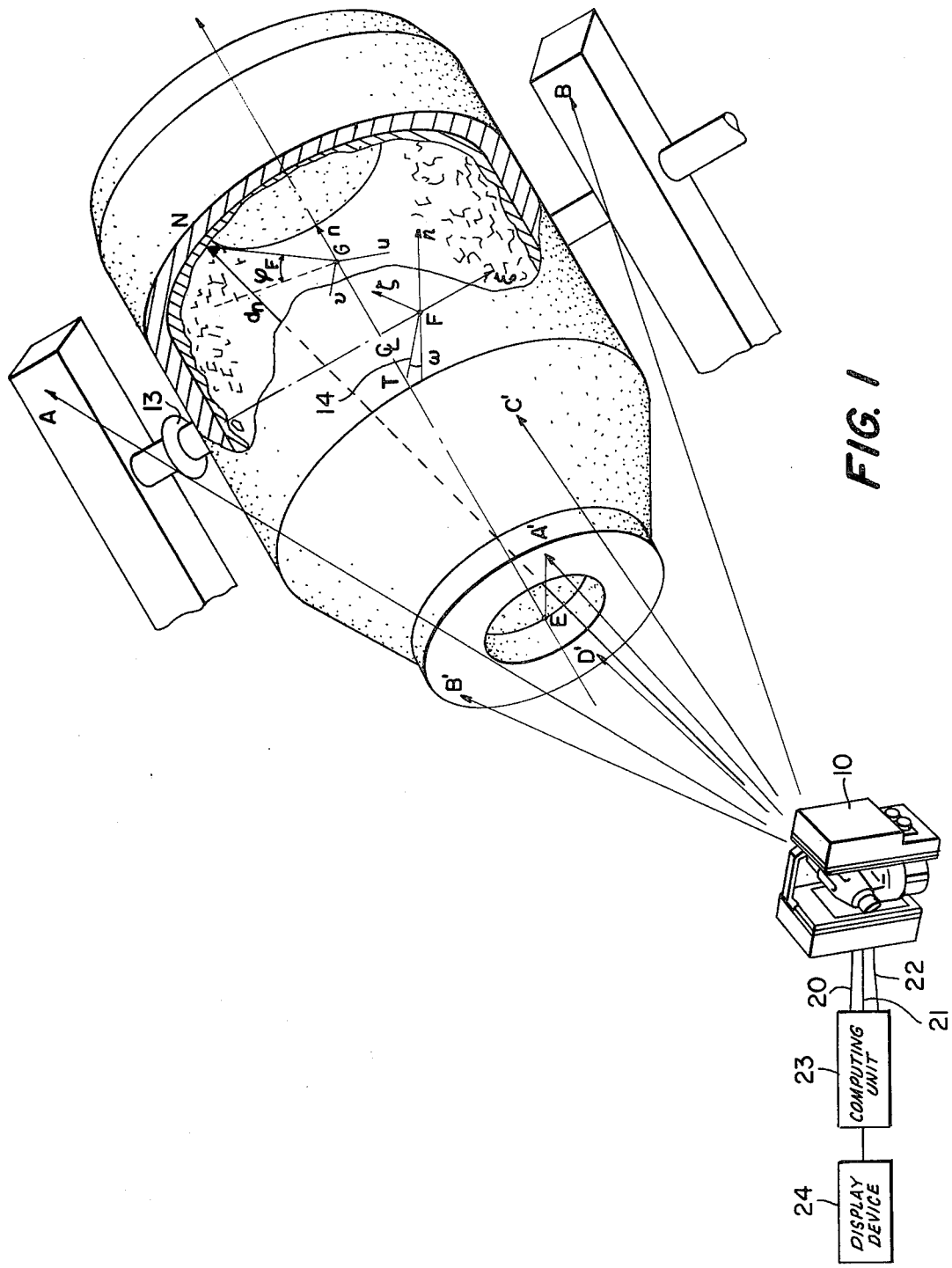
FIG. 1 is a perspective drawing of a distance and angle measuring instrument making measurements on a furnace in accordance with the teachings of the present invention.

Referring now to FIG. 1, we see an electro-optical instrument 10, such as an AGA GEODIMETER, Model 710 made by AGA Geotronics AB, Lidingö, Sweden, modified in accordance with the teachings of the co-pending U.S. Application Ser. No. 788,346 (cip) filed 1977, entitled "APPARATUS FOR MEASURING THE DISTANCE TO A POINT ON THE INNER WALL OF A HOT FURNACE" and invented by Ragnar Scholdstrom et al, incorporated herein by reference. This instrument measures distances and horizontal and vertical angles from the instrument. The instrument provides signals on the leads 20, 21 and 22 indicative of the various angles and distances measured. These signals are applied to a computing unit 23 which has a display unit 24 associated therewith.

Preferably, the computing unit 23 is a disc-top computer suitably provided with a key-board, from which the instrument operator can order the computing unit 23 to make the necessary calculations step by step. The instrument 10 is placed in front of a furnace 11 which is mounted for pivotal movement around a tilting axle 12 by a support structure.

To make a proper measurement three co-ordinate systems are used. Firstly the arbitrary earth related system with origin at the measuring instrument, the X, Y, Z-system, where the X-axis and the Y-axis preferably are in a truly horizontal plane and the Z-axis truly vertical. Secondly an earth related aid-system, $\xi$, $\eta$, $\zeta$ with the $\xi$-axis along the center of the tilting axle, the $\eta$-axis perpendicular to both the vertical and the tilting axle and the $\zeta$-axis orthogonal to the other two. Origin F of this aid system and the intermediate point T on the central axis are calculated to be the points where the distance between said lines is a minimum. Thirdly a furnace oriented co-ordinate system, the n. u. v-system, with the n-axis along the central axis, the v-axis parallel to the line intersecting both the center for the tilting axle and the central axis under right angles and the u-axis orthogonal to the other two. Origin G of the furnace oriented co-ordinate system is chosen to be set somewhere on the central axis, from which it is convenient to have the measurements of the furnace registered. The distance from T to G is best found from the design of the furnace.

In accordance with one embodiment of this invention there are at least two marks A, B situated on the fixed structure carrying the bearings. These marks have invariable co-ordinates in the earth related co-ordinate aid system $\xi$, $\eta$, $\zeta$. Marks A, B are placed so that a line through both marks is parallel to the tilting axle. It is also possible to establish marks A and B on the vessel. The easiest way to determine the direction of the tilting axle is made by having the marks strictly parallel to the tilting axle but with an angle measuring device placed on the tilting axle it is of course also possible to have two arbitrarily marked points on the vessel as a base for the calculations together with a reading of the angle measuring device.

After that the mesurements are made to the reference points A, B provided in the arbitrary system X,Y,Z by the instrument, the computing unit is calculating co-ordinate axes of the aid system, i.e. the $\xi$-axis along the tilting axle, the horisontal $\eta$-axis and the $\zeta$-axis perpendicular to the other two expressed in the natural earth related co-ordinate system X,Y,Z. The origin is also calculated in the X,Y,Z-system by means of the known co-ordinates of at least one of the reference points, A, B in the aid system $\xi$, $\eta$. In fact the computing unit 23 makes a co-ordinate transformance from a X,Y,Z-co-ordinate system with origin at the instrument to said $\xi,\eta,\zeta$-co-ordinate system.

The co-ordinates of origin F in the $\xi,\eta,\zeta$-system are calculated in the X,Y,Z-system to be:

$$F_x = A_x - A_\xi \xi_x - A_\eta \eta_x - A_\zeta \zeta_x$$

$$F_y = A_y - A_\xi \xi_y - A_\eta \eta_y - A_\zeta \zeta_y$$

$$F_z = A_z - A_\xi \xi_z - A_\eta \eta_z - A_\zeta \zeta_z$$

F is chosen in such a way that a line 14 can be drawn between the $\xi$-axis and the central axis of the furnace through F, which line is perpendicular to both said axes. If the $\xi$-axis and the central axis intersect, F is chosen to be the intersection point. The point F to be chosen is found by studying the vessel drawing, and its relation to the reference points A and B will be described later on. However, the values for making the said calculation are stored in a memory regarding the actual furnace in the computing unit at the very moment when measurements are made.

Next, the direction of the central axis of the furnace is to be found in the co-ordinates $\xi$, $\eta$, $\zeta$. Since the $\eta$-axis is horizontal and the line between the $\xi$-axis and the central axis through F intersecting both is perpendicular to both said lines and also is intersecting the $\eta$-axis, the angle $\omega$ between the $\eta$-axis and said line will give the condition necessary for the calculation of the position of the central axis. This angle could be derived in many ways. One of the easiest is to have an angle measuring device 13 such as a resolver, a synchro, a goniometer or any other suitable device placed on the tilting axle. The measurement of the angle $\omega$ could also be calculated from the measurements to one of a number of strategically placed reference marks C with known furnace related co-ordinates. The way of deducting the angle $\omega$ is apparent for everybody acquainted with geometry. The computing unit is provided with data concerning the position of point C in furnace related co-ordinates and a program for calculating the angle $\omega$.

Next the intersection point T between the central axis and line 14 in the co-ordinates $\xi$, $\eta$, $\zeta$ are transformed into the co-ordinates X,Y,Z by the computing unit 23. Since the direction of the central axis in relation to the tilting axis and the line 14, due to the calculated angle $\omega$, is known, the position of the central axis is calculated in X,Y,Z-co-ordinates.

Line 14 has the same direction as the v-axis of the co-ordinates of the furnace related co-ordinate system n, u, v. The n-axis of this system is directed along the central axis. The u-axis is orthogonal to the other two. Therefore, the next step is to find the origin G of the furnace related system, and this is easily made, since the distance between points T and G along the central axis is selected from the design of the furnace.

Now, the measuring could be made to a point inside the furnace, whose co-ordinates in the furnace related co-ordinate system are wanted. By this measurement the co-ordinates of the measured point are provided, and since the computing unit has calculated the position of the furnace related co-ordinate system in the co-ordinate system X,Y,Z related to the measuring device a co-ordinate transformation is made. The output to the display device 24 is thus the co-ordinates of the measured point in the furnace related system.

ASSESSMENT OF THE INVARIABLES OF THE FURNACE

In order to establish the invariables of the furnace and its tilting mechanism various measurements have to be made once. These measurements supply true and reliable data on which the above mentioned calculations are based and must always be made before it is possible to make ordinary measurements to a furnace. Such true condition establishing measurements may have to be repeated if the marks or the conditions have been changed in some way. There is also a possibility of axial play in the tilting bearings or small thermal or elastic deformations may occur.

Figure 2:
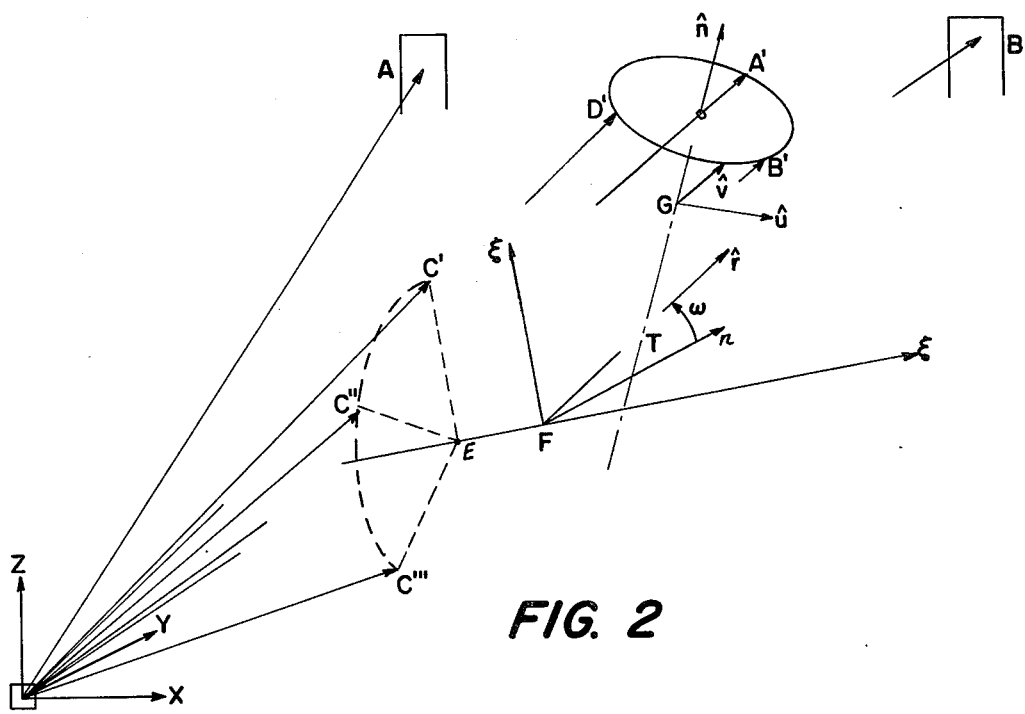
FIG. 2 is a graphical representation showing the three co-ordinate systems used and showing measurements in accordance with an embodiment of the invention.

FIG. 2 shows a diagram and with reference to this the way of making the condition establishing measurements is described.

In order to get the direction of the tilting axle for the evaluation of the marks A, B, a measurement can be made to a mark C on the furnace to be aimed at in at least three different tilting positions. The mark C will describe a circle and the tilting axle will go through the center of that circle perpendicular to the plane through the measured positions of point C. If the instrument related co-ordinates of point C in the three different positions are C', C'', C''', then the tilting axle is directed in the same direction as the vector.

$$\xi = (\overline{C'} - \overline{C}) \times (\overline{C''} - \overline{C'})$$

When this direction is derived points A and B could be specified, so that a line through A and B is parallel to the tilting axle, or if points A and B are already marked increments could be calculated to specify a line parallel to the tilting axle.

Next the position of the central axis of the furnace is to be found. This could be made by measuring three points on the furnace, which we have reason to believe are concentric and perpendicular to the central axis of the furnace. Such points could for instance be bolts on the mouthpieces or marks could be provided on the bottom part of the furnace. In a similar way as above the direction of the central axis and with the teachings of our U.S. Pat. No. 4,025,192 also the central point E is calculated.

With a knowledge of the positions of the tilting axle and the central axis in earth related co-ordinates, line 14 and the points F and T are easily deducted as being the shortest line between said two lines in space.

In the same set-up in which the central axis has been measured at least one easily identifiable point C on the outside of the furnace is also measured and the furnace related co-ordinates of this C-point are calculated. These co-ordinates are later used to resolve the tilting angle and co-ordinates of other points. If the furnace is equipped with a device measuring the tilting angle precisely, then no C-point is needed for that purpose. In that case the co-ordinates of the A-mark can be used for the calculation of the co-ordinates of other measured points, provided that there is no appreciable axial play in the bearings. A measurement of a first C-point can be used to calibrate other C-points in other tilting positions.

The result of all such calculations made by the computing unit 23 regarding an individual furnace are stored for example on a magnetic tape or a floppy-disc. When the operator has placed his instrument in front of a certain furnace and before the actual measurement is made he enters the specific code for the furnace in question, so that the computing unit gets an indication of which data to read for obtaining adequate parameters for this specific furnace.

How the computing unit works and how it is programmed is not specifically described, since disc-top computers nowadays are used very frequently in all sorts of equipments and thus the handling of such units is very well known for a man skilled in the art.

It is also apparent that these last mentioned test measurements and calculations in order to get the relations between points A and B and the tilting axle and the measurements to get the real position of the central axis also could be used in the ordinary measurement procedure for making measurements to points inside a furnace to which the exact positions are to be known in order to estimate the weardown of the refractory lining on the inside. Thus, also the test measurement procedure is a part of this invention.

For two reasons it is advantageous to establish and to calibrate some outside reference points $C_1$, $C_2$ etc. on the furnace, on places being well visible and clean or easy to clean from slag. These points $C_1$, $C_2$ are chosen to have a sufficient distance from the tilting axle and at least one should be visible from whatever positions measurements are to be made to get a proper view of the inside of the furnace. Suitable positions of $C_1$, $C_2$ etc. could also be taken from furnace drawings if they are reliable. The first reason is to provide means for resolving tilting angle. The second is to provide furnace related references for the calculation of inside points, references which are independent of a possible axial play in the tilting bearings.

MEASUREMENTS OF THE LINING

For productive measurements the furnace is clamped in a tilting position giving a desired view of the inside. The instrument is in succession pointed at A, B and one suitable C point. Using the data from the calibration stored on the permanent memory of the computer calculations of the furnace related co-ordinates are possible calculating from A to F to T to G and to calculate all necessary directions such as $\xi$, $\eta$, $\zeta$ and n, u, v to be performed by the computer 23.

This calculation is preferably made in the following way. Since the vector $\overline{C}$ from the distance measuring device and the C point is measured we can solve for $\omega$. F is independent of $\omega$. From there we have:

$$\overline{T} = \overline{F} + f \cdot \cos \omega \cdot \hat{\eta} + f \cdot \sin \omega \cdot \hat{\zeta} \ldots$$

$$\overline{G} = \overline{T} + h_o \cdot \cos \epsilon \cdot \cos \omega \cdot \hat{\zeta} - h_o \cdot \cos \epsilon \cdot \sin \omega \cdot \hat{\eta} + h_o \cdot \sin \epsilon \cdot \hat{\xi}$$

where f is the distance between T and F, $h_o$ is the distance between T and the origin of the co-ordinate system n, u, v and $\epsilon$ is the angle between the direction of the co-ordinate $\xi$ and the co-ordinate $\hat{n}$.

$$\overline{C} = \overline{G} - h_C \sin \epsilon \cdot \hat{\xi} - h_C \cos \epsilon \cdot \cos \omega \cdot \hat{\zeta} + h_C \cos \epsilon \cdot \sin \omega \cdot \hat{\eta} + u_C \cos \epsilon \cdot \hat{\xi} - u_C \sin \epsilon \cdot \cos \omega \cdot \hat{\zeta} + u_C \sin \epsilon \cdot \sin \omega \cdot \hat{\eta} + v_C \cos \omega \cdot \hat{\eta} + v_C \sin \omega \cdot \hat{\zeta} \ldots$$

where $h_C$, $u_C$, $v_C$ are the co-ordinates of point C in the co-ordinate system n, u, v. These equations are serially connected and the terms are sorted in three groups, independent of $\omega$, with the factors $\cos \omega$ and $\sin \omega$. We get:

$$\overline{C} - \overline{F} - [(h_o - h_C)\cdot \sin \epsilon + u_C \cdot \cos \epsilon]\hat{\xi} = \cos \omega\{(f + v_C)\cdot \hat{\eta} + [(h_o - h_C)\cos \epsilon - u_C \sin \epsilon]\cdot \hat{\zeta}\} + + \sin \omega\{[u_C \sin \epsilon - (h_o - h_C)\cos \epsilon]\cdot \hat{\eta} + (f + v_C)\cdot \hat{\zeta}\} \ldots$$

This expression constitutes three equations in the X-, Y- and Z-direction. We use the Y- and Z-parts, which usually are most significant. An abbreviation is done of the result in the Y-direction as $$a_y = b_y \cos \omega + c_y \sin \omega \ldots$$

and in the Z-direction as $$a_z = b_z \cos \omega + c_z \sin \omega \ldots$$

Dividing by $\cos \omega$ and the last equation by the second last we get $$\omega = \text{atn}\left\{\frac{a_z b_y - a_y b_z}{a_y c_z - a_z c_y}\right\} + 90\left(1 - \frac{D}{|D|}\right)$$

The method in accordance with the invention is not only suited for making measurements to the inside of a blast furnace in order to indicate the weardown of the lining. There are many other objects moving around an axle, the dimensions of which change from time to time, for instance by weardown. One example of such a device could be a mixer and in FIG. 3 a cylindrical mixer 30 is shown, to which measurements are made in order to indicate the weardown of its inner wall.

Figure 3:
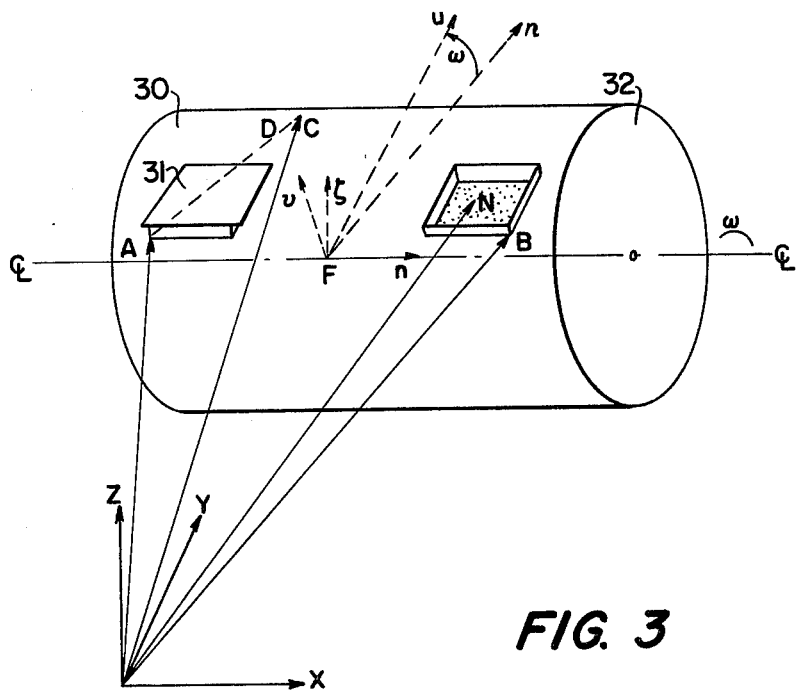
FIG. 3 is a schematically drawn perspective drawing showing a measurement in accordance with a third embodiment of the invention.

As is apparent from FIG. 3 this special mixer has coinciding central axis and tilting axle. In this case points A and B defining a line parallel to the central axis are marked on the vessel or easily found on natural details, such as on the hatches 31 and 32 placed side by side on the envelope surface of the cylindrical vessel. The tilting axle goes through the center of the end faces of the vessel. In this embodiment the vessel oriented co-ordinates are best chosen to be cylindrical co-ordinates with the z-axis along the central line of the vessel.

A point C is selected, which is non-collinear with points A and B. Point C is selected to permit the resolving of the rotation angle $\omega$ with reasonable accuracy and must be well defined on the drawings in cylindrical co-ordinates of the vessel and must also be well visible from the position of the instrument. The instrument is placed so as to permit visible access to the inside surfaces, which are of interest.

As in the embodiment showed in FIGS. 1 and 2 three co-ordinate system are used. Firstly the arbitrary system with origin at the measuring instrument, the X,Y,Z-system, where the X-axis and the Y-axis preferably are in a truly horizontal plane and the Z-axis truly vertical. Secondly the aidsystem $\xi, \eta, \zeta$ with the $\xi$-axis along the central axis, the $\eta$-axis perpendicular to the true vertical and the tilting axle and the $\zeta$-axis orthogonal to the other two, and origin preferably in the middle of the vessel. Thirdly the vesseloriented cylindrical co-ordinate system with its z-axis along the central line for the vessel, r-axis perpendicular to the central line and $\phi$ chosen to be counted from a line m, which in a position for the vessel, when $\omega = 0$, coincides with the $\eta$-axle of the aid system.

The rotation angle $\omega$ is most easily found by reading an angle measuring device placed on the tilting axle, but if this possibility is not present the following procedure preferably is to be used. A difference vector $\overline{D} = \overline{C} - \overline{A}$ is calculated. The position of this vector is known in the vessel oriented cylindrical co-ordinates and is transformed into cartesian co-ordinates u, v, n with the u-axis along the m-line, the n-axis along the central axis and the v-axis orthogonal to the other two. Projections of the vector $\overline{D}$ on the co-ordinate axes $\eta$ and $\zeta$ are calculated as scalar products.

$$\overline{D} \cdot \hat{\eta} = D_u \cdot \cos \omega - D_v \cdot \sin \omega = S_1$$

$$\overline{D} \cdot \hat{\zeta} = D_u \cdot \sin \omega - D_v \cdot \cos \omega = S_2$$

with $$e = S_1/S_2$$

we get after division $$\tan \omega = (D_u - e \cdot D_v)/(e \cdot D_u - D_v)$$

since the angle now is known, the principal directions of the vessel could be derived:

$$\hat{u} = \cos \omega \cdot \hat{\eta} + \sin \omega \cdot \hat{\zeta}$$

$$\hat{v} = \cos \omega \cdot \hat{\zeta} - \sin \omega \cdot \hat{\eta}$$

The co-ordinates of origin of the aid system and the vessel-oriented system best chosen as the central point could now be calculated starting from on of the points A, B or C, e.g. C, as $$\overline{F} = \overline{C} - C_u \cdot \hat{u} - C_v \cdot \hat{v} - C_n \cdot \hat{n}$$

When every detail of the vessel oriented co-ordinate system u, v, n now is known in relation to the instrument-oriented co-ordinate system X, Y, Z, measurements to points inside the vessel could be made and a co-ordinate transform could be made by the computing unit from the X,Y,Z-system to the u,v,n-system in order to express the result of the measurements related to the vessel and feed it to the display device 24.

It should be understood that while the invention has been described with respect to two particular embodiments thereof, numerous others will become obvious to those with ordinary skill in the art in light thereof.

We claim:

1. A method for determining the wear of the surface of an object by making a series of measurements of the relative position of a measured point on the surface of an object in an object related co-ordinate system having coordinate axes where the object is turnable around an axle, said axle being stationary both in said object related co-ordinate system and in an earth related co-ordinate system having co-ordinate axes, said measurements being effected by means of a distance—and angle-measuring device placed in an arbitrary position in said earth related co-ordinate system; comprising the steps of a. measuring the position of a mark on the object as the object is tilted in at least three different tilting positions around said axle, b. calculating the perpendicular of a plane going through the measured positions of said mark and the centre of the circle going through said positions, the perpendicular line going through the centre being said axle, c. evaluating the position in said earth related system of a line along one of the co-ordinate axes in said object related co-ordinate system the object being in a fixed position, and establishing the origin of said object related system, d. calculating the other co-ordinate axes of said object related co-ordinate system in said earth related co-ordinate system using a known relation between said axle and said line evaluated in step c, so that said measured point with known co-ordinates in said earth related co-ordinate system is transformed to co-ordinates in said object related co-ordinate system, e. comparing the co-ordinates of said measured point of said object related co-ordinates of said system with the co-ordinates of said measured point taken at an earlier time to determine the change of position of said measured point and hence the wear of the surface of the object.

2. A method according to claim 1, wherein the evaluation of said line in step d. is made by measuring at least three non-collinear marks on said object having said object clamped in a tilting position showing said marks, said marks having a known relation to an axis of said object going along one of the co-ordinates axes of said object related co-ordinate system.

3. A method according to claim 1, wherein the evaluation of said line in step d. is made by means of measuring to a point of said object with known position in said object related co-ordinate system and by means of the known relation between said line and said axle in said object related co-ordinate system.

4. A method according to claim 1, wherein when the position of said axle in relation to the position of said distance- and angle-measuring device is measured, a second earth related aid co-ordinate system pertaining to said axle is calculated, said aid co-ordinate system preferably having its first co-ordinate axes along said axle, its second co-ordinate axes perpendicular to said axle and a true vertical and its third co-ordinate axes orthogonal to the other two, said aid co-ordinate system preferably having its origin at the intersection point between said axle and a line having the shortest distance between said axle and said line evaluated in step c.

5. A method according to claim 2, wherein as a step e. measuring is made of at least one stable and visible mark on said object in said clamped position and a co-ordinate transformation from said earth related to said object related co-ordinate system is made for the measured position of said point, the result being stored and used at later measuring procedures for evaluating said line in step c. since a calculation of said object related co-ordinates of said mark is a base for resolution of the tilting angle and point measurements.

6. A method according to claim 1, wherein as a further step a measurement is made of at least two marks stationary in said earth related co-ordinate system having determinable relation to the location of said axle in said earth related co-ordinate system and storing the obtained invariable parameter preferably on a permanent computer memory.

7. A method for determining the wear of the surface of an object by making a series of measurements of the relative location of a measured point on the surface of an object in an object related co-ordinate system having co-ordinate axes where the object is turnable around an axle, said axle being stationary both in said object related co-ordinate system and in an earth related co-ordinate system having co-ordinate axes, said measurements being effected by means of a distance—and angle—measuring device placed in an arbitrary position in said earth related co-ordinate system; comprising the steps of a. measuring the location of at least two marks in space with a determinable relation to the location of said axle in said earth related co-ordinate system, b. calculating the related location of said axle and said distance measuring device using the measuring result of said marks measured in step a. in said earth related co-ordinate system, c. measuring the angular position of said object around said axle in relation to a reference position in said earth related co-ordinate system, d. calculating the related location between a line in said object with a predetermined position in said object related co-ordinate system different from the position of said axle and said distance measuring device in said earth related co-ordinate system using the measuring results from the measuring in steps a. and c., e. measuring said point, whose location is to be determined, f. calculating the position of said point in said object related co-ordinate system using the locations of said axle calculated in step b. and of said line calculated in step c. and the position of said point in said earth related co-ordinate system; and g. comparing the location of said point in said object related system with the location of said point taken at an earlier time to determine the change in location of said point and hence the wear of the surface of the object.

8. A method according to claim 7, wherein said marks are two and where a line parallel to said axle is derived from the measuring results of said marks and the position of said axle is determined from the derived direction and the known relation to one of said marks.

9. A method according to claim 7, wherein the measuring of the angular position of said object is made by measurement of a mark on said object with known position in said object related co-ordinate system.

10. A method according to claim 7, wherein the measuring of the angular position of said object is made by reading off an angular measuring device placed on said axle.

11. A method according to claim 7, wherein said marks in space are known in an earth related co-ordinate aid system having one co-ordinate axis along said axle and another co-ordinate axis horizontally directed, said aid system being determined in relation to a natural earth related co-ordinate system with origin at the distance measuring device by the measurement made under step c., and that all calculations regarding the location of said object related co-ordinate system are transformed to said natural system.

* * * * *